(12) United States Patent
Amey et al.

(10) Patent No.: US 6,335,609 B1
(45) Date of Patent: Jan. 1, 2002

(54) METHOD FOR REDUCING PEAK PHASE CURRENT AND DECREASING STARING TIME FOR AN INTERNAL COMBUSTION ENGINE HAVING AN INDUCTION MACHINE

(75) Inventors: David L. Amey, Birmingham; Michael W. Degner, Farmington Hills, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/567,246

(22) Filed: May 9, 2000

(51) Int. Cl.⁷ ................................................. H02P 5/40
(52) U.S. Cl. ..................... 318/811; 318/805; 318/804
(58) Field of Search ................................. 318/802, 804, 318/806, 830, 832, 727, 725, 778, 140, 805, 811

(56) References Cited

U.S. PATENT DOCUMENTS

| | | | |
|---|---|---|---|
| 3,427,526 A | | 2/1969 | Kernick .......................... 321/5 |
| 4,470,001 A | | 9/1984 | Resch et al. ................. 318/810 |
| 4,649,331 A | * | 3/1987 | Jahns .......................... 318/798 |
| 4,698,577 A | | 10/1987 | Seymour et al. ............. 318/805 |
| 4,845,418 A | | 7/1989 | Conner ........................ 318/778 |
| 5,204,607 A | | 4/1993 | Hugel et al. ................. 318/806 |
| 5,334,923 A | * | 8/1994 | Lorenz et al. ............... 318/805 |
| 5,402,053 A | | 3/1995 | Divan et al. ................. 318/768 |
| 5,444,351 A | * | 8/1995 | Yamamura et al. .......... 318/811 |
| 5,652,495 A | * | 7/1997 | Narazaki et al. ............ 318/716 |
| 5,701,066 A | * | 12/1997 | Matsuura et al. ........... 318/808 |
| 5,739,664 A | * | 4/1998 | Deng et al. .................. 318/808 |
| 5,789,881 A | * | 8/1998 | Egami et al. ................ 318/139 |
| 5,801,497 A | * | 9/1998 | Shamoto et al. ............ 318/139 |
| 5,811,957 A | * | 9/1998 | Bose et al. .................. 318/802 |

OTHER PUBLICATIONS

Article: "Increasing The Dynamic Torque Per Ampere Capability of Induction Machines".

* cited by examiner

*Primary Examiner*—Robert E. Nappi
*Assistant Examiner*—Rita Leykin
(74) *Attorney, Agent, or Firm*—Karl A. Vick (57) ABSTRACT

A method for reducing the starting time and reducing the peak phase currents for an internal combustion engine that is started using an induction machine starter/alternator. The starting time is reduced by pre-fluxing the induction machine and the peak phase currents are reduced by reducing the flux current command after a predetermined period of time has elapsed and concurrent to the application of the torque current command. The method of the present invention also provides a strategy for anticipating the start command for an internal combustion engine and determines a start strategy based on the start command and the operating state of the internal combustion engine.

15 Claims, 7 Drawing Sheets

METHOD FOR REDUCING PEAK PHASE CURRENT AND DECREASING STARING TIME FOR AN INTERNAL COMBUSTION ENGINE HAVING AN INDUCTION MACHINE

This invention was made with Government support under Prime Contract No. DE-AC36-83CH10093, Subcontract No. ZCB-4-13032-02, awarded by the Department of Energy. The Government has certain rights in the invention.

TECHNICAL FIELD

The present invention relates generally to an internal combustion engine that is started using an integrated starter/alternator induction machine, and more particularly to a method for reducing the starting time and peak phase currents when starting the internal combustion engine.

BACKGROUND OF THE INVENTION

High performance torque control of induction machines is based on the concept of field orientation. Field orientation controls the stator currents such that independent control of both the flux and the torque in the machine is achieved. The flux angle used for field orientation can be any one of many fluxes present in the machine. For example, the stator, airgap, or rotor flux. Field orientation based on the rotor flux is the most popular.

There are two different strategies for implementing field orientation. The first, Direct Field Orientation (DFO), orients the control of the stator currents to the flux angle obtained from either a measurement of the flux in an induction machine, or from an estimation of the flux. The second, Indirect Field Orientation (IFO), is based on the slip frequency relationship that must be true in order to align the rotor flux on the direct axis.

In the implementation of either DFO or IFO, the stator current in the rotor flux synchronous reference frame is divided into two components. One component is aligned with the rotor flux vector and the other component is perpendicular to the rotor flux vector. The axis that is aligned with the rotor flux is typically called the direct or d-axis. The axis that is perpendicular to the rotor flux is typically called the quadrature or q-axis.

Figure 1:
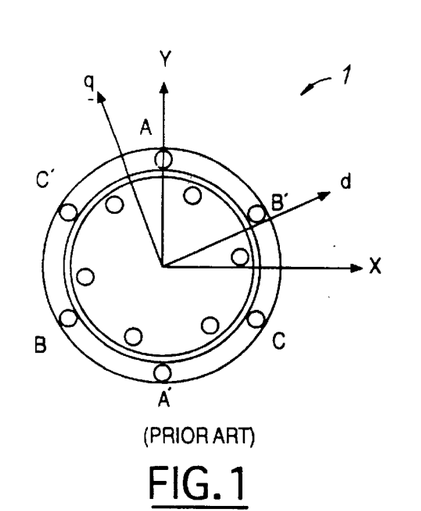
FIG. 1 is a depiction of the reference frames associated with an induction machine.

FIG. 1 depicts the reference frames 1 for an induction machine and the relationship between the synchronous (d–q), stationary (x–y) and abc phase windings.

The overall stator current in the induction machine is related to the d and q-axis stator currents by the relationship:

$$I_s^2 = i_{ds}^2 + i_{qs}^2 \quad (1)$$

The component of the stator current along the d-axis is solely responsible for the production of the rotor flux:

$$\lambda_{dr} = \frac{L_m}{(L_r/r_r)p + 1} i_{ds} \quad (2)$$

The component of the stator current along the q-axis, $i_{qs}$ is proportional to the amount of torque produced:

$$T = \frac{3}{2} \cdot \frac{P}{2} \cdot \frac{L_m}{L_r} \lambda_{dr} i_{qs} \quad (3)$$

where:
p=number of poles
$\lambda_{dr}$=d-axis rotor flux
$i_{ds}$=d-axis stator current
$i_{qs}$=q-axis stator current
$L_m$=magnetizing inductance
$L_r$=rotor inductance
$r_r$=rotor resistance Equations (1), (2), and (3) show that independent control of both the rotor flux and torque of the machine can be achieved by controlling the d and q-axis stator currents.

Figure 2:
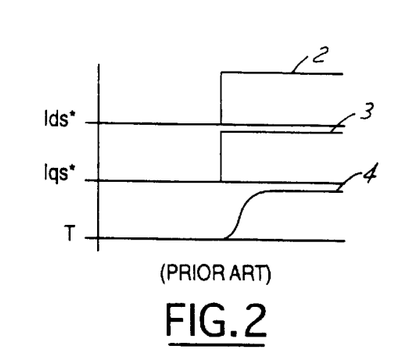
FIG. 2 is a graph depicting the resulting torque response for the brute force starting method known in the prior art.

Currently known in the art is a brute force starting method in which the flux current command, $i_{ds}^*$ and the torque current command, $i_{qs}^*$ are both applied at the same time the start command for the internal combustion engine is received. The flux current command, $i_{ds}^*$ is set to a level that results in a desired steady-state rotor flux level, and remains constant throughout the starting event. The torque current command, $i_{qs}^*$ is calculated from the flux current command, $i_{ds}^*$ and the torque command using equation (3) above subject to the overall stator current limit. FIG. 2 is a graphical representation of the current commands, $i_{ds}^*$ 2 and $i_{qs}^*$ 3, and the resulting torque 4 using the brute force starting method described herein.

There are several disadvantages associated with the brute force starting strategy. First there is a significant delay in the starting response time. The time delay in the starting response is a result of the need to build up the rotor flux in order to produce the desired torque. It is known by equation (2) that there is a low pass filter dynamic on the rotor flux as a function of the flux current command, $i_{ds}^*$, with a time constant equal to the rotor time constant, $L_r/r_r$. Therefore, with a constant torque current command, $i_{qs}^*$, the torque also builds up at this rotor time constant.

Another disadvantage is the high peak currents. The high peak currents are a result of commanding a large initial output torque while commanding a large flux current command, $i_{ds}^*$ to build and maintain the desired rotor flux in the induction machine. During the period of time when the rotor flux is increasing, high stator currents are present in the induction machine in an attempt to produce a large torque. This is in spite of the fact that almost no actual torque is being produced. Therefore, a large percentage of the current, and energy, other than that being used to build the rotor flux, is essentially wasted.

Yet another disadvantage lies in the fact that the high flux current command, $i_{ds}^*$ is maintained for the duration of the starting event. The result is a further waste of energy. After the initial portion of the start event, little or no torque is required to maintain the engine speed until the engine is started.

In the prior art strategies for starting an internal combustion engine using a starter/alternator induction machine, the peak phase currents are typically very large. Additionally, a delay in the engine start time is caused by starting the engine without any flux in the induction machine and having to wait for the flux to build-up to a sufficient level.

SUMMARY OF THE INVENTION

It is an object of the present invention to reduce peak phase currents to reduce the size and cost of the power inverter and not adversely affect the capability of the system. It is another object of the present invention to provide fast response and engine start times by eliminating the delay caused by flux build-up.

It is a further object of the present invention to produce the desired torque as soon as the torque command is received by the system. It is still a further object of the present invention to provide efficient use of the flux energy.

In carrying out the above objects and other objects and features of the present invention, a method is provided for starting an internal combustion engine using a starter/alternator induction machine. i.e. for a hybrid electric vehicle. In the method of the present invention the peak phase currents are minimized, reducing the demand on the power inverter and achieving fast engine start times. According to the method of the present invention, the stator d and q-axis current commands are controlled such that the peak phase currents necessary for starting the internal combustion engine are reduced, while field oriented torque control of the induction machine is maintained, and the torque necessary to provide seamless starting of the engine is produced.

The control method involves pre-fluxing the motor prior to applying the torque command to start the engine. At the time the torque command is applied, the flux command is stepped down to a lower value, allowing the flux to decay to a lower level at a rate equal to the rotor time constant of the induction machine. The control method uses information from vehicle signals and other vehicle subsystems to determine when to perform the pre-flux action.

The method of the present invention is also capable of sensing and determining when a starting event is about to occur. The present invention also provides a strategy for determining the level of starting performance that is required for an impending starting event, as well as how to handle a delayed starting event or a false starting event.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

The present invention provides several embodiments that adjust the control of both the rotor flux and torque of an induction machine during an engine start, thereby improving the response time and reducing the peak stator phase currents required. FIGS. 5–17 generally depict the various embodiments of the present invention, while FIGS. 1–4 are background information.

Figure 3:
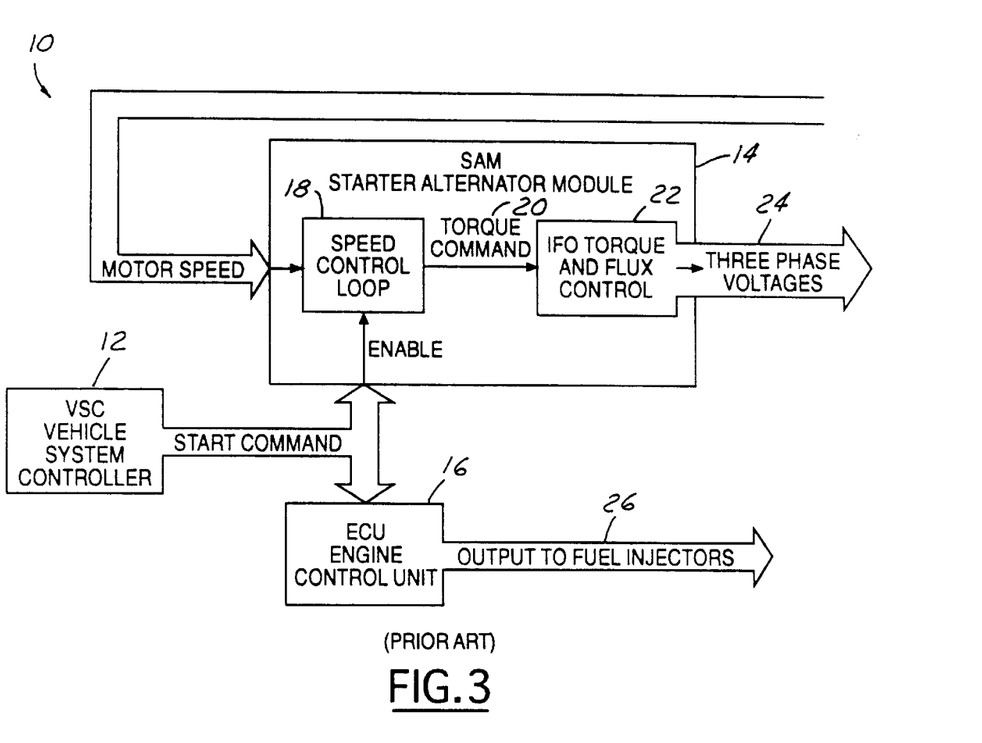
FIG. 3 is a block diagram of the systems used in starting an internal combustion engine.

Referring now to FIG. 3 there is shown a block diagram of the systems involved in starting an internal combustion engine using a starter/alternator induction machine. It should be noted that while the embodiments of the present invention are being described herein with reference to a hybrid-electric vehicle internal combustion engine, it is possible to apply the methods of the present invention to other applications as known by one of ordinary skill in the art. An "engine starting" event 10 begins at the time when a torque command is applied to a starter/alternator controller in an attempt to start an internal combustion engine. For a hybrid-electric vehicle, the request to start the engine is sent by a vehicle system controller 12 to a starter/alternator module 14 and an engine control unit 16. The starter/alternator module 14 enables a speed control loop 18, having a predetermined reference speed command. The output of the speed control loop 18 is the torque command 20 that is fed into an IFO torque and flux controller 22. The IFO controller 22 outputs 24 three-phase voltage commands that will be generated by a hardware inverter (not shown).

Figure 4:
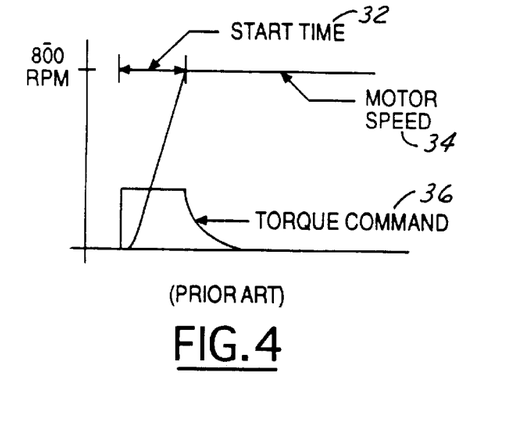
FIG. 4 is a graph depicting the starting time period for a starting event used as a testing metric for the embodiments of the present invention.

The point at which the "engine starting" event ends is defined as the point at which the starter/alternator reaches a predetermined target speed. FIG. 4 is a graph depicting a testing metric 30 defined by the period of the "engine starting" event. The testing metric 30 will be used as a comparison for the starting strategies defined by the various embodiments of the present invention and is independent of the engine control unit's 16 command 26 (shown in FIG. 3) to inject fuel into the cylinders. FIG. 4 is an illustration of the starting time 32 to achieve the desired motor speed 34, 800 RPM in the present example, in response to the applied torque command 36.

Figure 5:
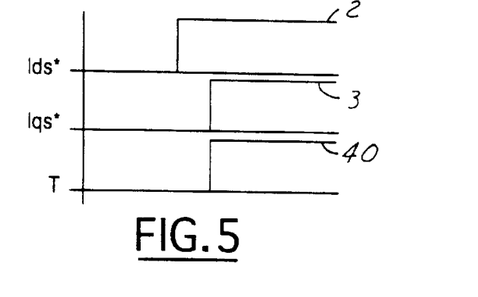
FIG. 5 is a graph depicting the resulting torque response for the pre-flux embodiment of the method of the present invention.

The first embodiment of the present invention is called the pre-flux starting method. According to this embodiment of the present invention, a change in the timing of the application of the current commands, $i_{ds}^*$ and $i_{qs}^*$ is used. In particular, the method involves applying the flux current command, $i_{ds}^*$ for a predetermined period of time prior to applying the torque current command, $i_{qs}^*$. The flux current command leads the torque current command for a long enough period of time to allow the rotor flux to build-up to an acceptable level. FIG. 5 is a graph of the resulting torque response 40 for the pre-flux starting method. The flux current command 2 is applied prior to the application of the torque current command 3, thereby eliminating the delay in the starting response time. The rotor flux is built-up before the request to start the engine is applied. By having the rotor flux already present in the induction machine when the start command is received results in the ability to produce the desired level of torque almost instantaneously. The time delay is eliminated. However, the high peak currents are still present.

Figure 6:
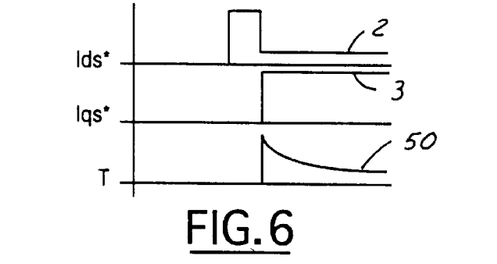
FIG. 6 is a graph depicting the resulting torque response for the pre-flux with step-down embodiment of the method of the present invention.

In another embodiment of the pre-flux starting method described above, the flux current command, $i_{ds}^*$ is applied before the torque current command, $i_{qs}^*$ and is stepped down at the point in time when the torque current command, $i_{qs}^*$ is applied. The flux in the rotor is built-up and then the lowered flux current command allows the flux to decay to a lower level at a rate equal to the rotor time constant. Therefore, the flux is initially high enough to produce a large torque, and then decays to a lower level when less torque is necessary. The torque producing current, $i_{qs}^*$ is essentially unchanged, but the overall peak phase current is lower since the flux current command component is much smaller. FIG. 6 is a graph depicting the flux current command 2, the torque current command 3, and the resulting torque response 50.

Figure 7:
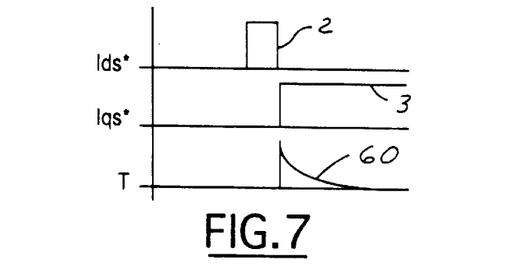
FIG. 7 is a graph depicting the resulting torque response for the pre-flux with step-down to zero embodiment of the method of the present invention.

In yet another embodiment, shown in FIG. 7, it is possible to reduce the flux current command 2 to zero when the torque current command 3 is applied. In some applications, the resulting torque response 60, which peaks and then returns to zero, is useful. This method is particularly useful for applications where there is minimal stored energy available for starting the engine.

The flux reducing methods of the present invention step down the flux command to a level that is much lower than nominal, potentially even zero. This allows the torque producing current to be maximized. The method of the present invention allows a much larger torque to be produced for a smaller current rating since the flux producing current does not need to be applied. The current ratings of the controller electronics can be substantially reduced and still produce the same peak torque. This essentially reduces the overall size and cost of the system.

The lower flux command is possible because the peak torque requirements for the engine start event are very short in duration, i.e. typically less than two rotor time constants. The result is that the decay in the flux level associated with the lower, or zero, flux command does not significantly affect the overall operating system. In fact, the higher peak torque capability at the beginning of the engine start event more than compensates for the reduced capability at the end of the start event.

In a further embodiment, the flux current command, $i_{ds}^*$ is commanded to a value that is higher than necessary to achieve the desired rotor flux for the pre-flux time period. An initially higher flux current command shortens the amount of time needed for pre-fluxing by building up the rotor flux faster than it would be if the flux current command were based on the desired steady-state rotor flux. As the actual rotor flux approaches the desired level, the flux current command can be decreased to maintain the desired rotor flux until the starting event has occurred. It should be noted that while a higher-than-necessary initial flux current command means faster pre-fluxing, the initial flux current command applied is hardly unlimited. During pre-fluxing, the flux current command is limited by stator current constraints, energy utilization issues, and potentially overheating of the stator windings.

The pre-fluxing of the induction machine can be accomplished by any one of several methods known to one of ordinary skill in the art. The only condition is that the pre-fluxing method used build the flux up to a desired level at a rate as fast as possible. In accomplishing this, the amount of torque produced for the amount of current used is maximized and the amount of time for pre-fluxing is minimized.

To confirm the advantages of the present invention, tests were conducted on a hybrid-electric vehicle having a diesel engine. The tests were performed while starting a warm engine, i.e. >50° C., whose idle speed was set at 880 RPM. The reference command for the starter/alternator speed control loop was set to 800 RPM. Each of the starting strategies according to the present invention were tested at various maximum torque levels.

Figure 8:
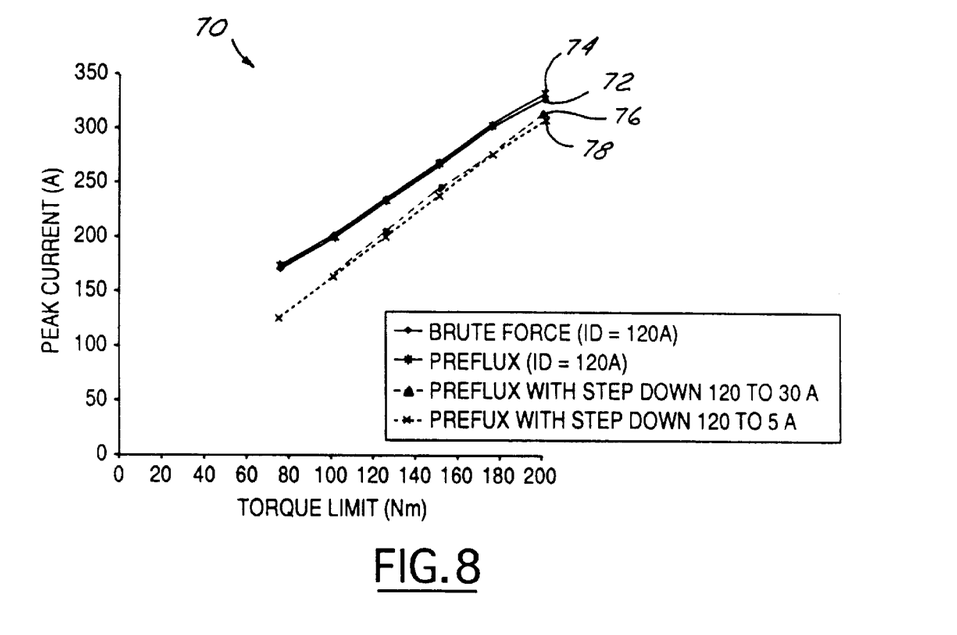
FIG. 8 is a comparison graph showing the peak phase currents as a function of the torque limit for each embodiment of the present invention.

FIG. 8 is a plot 70 of the peak starting current vs. the torque limit. The plots demonstrate the reduced peak phase currents obtained by stepping down the flux command after the pre-fluxing period. As anticipated, the brute force method 72 and the pre-flux method with a constant flux current command 74 have similar peak phase currents for the full range of torque limits. Also as expected, the pre-flux method with a step-down in the flux current command 76 shows a significant decrease in the peak current. Further, the pre-flux method with a step-down approaching zero 78 also shows further reduction in the peak phase current.

It can be determined from FIG. 8 that the length of the pre-flux period does not have an effect on the peak phase currents since the total stator current, $I_s$, does not depend on this variable. The length of the pre-flux period is optimally chosen as the minimum amount of time for the rotor flux to reach a level that is sufficient for a satisfactory start given the inverter stator current constraints, which are manufacturer specific based on the ratings of devices used in the inverter. It should be noted that it is possible for the minimum pre-flux time period to be shorter than the amount of time required for the rotor flux to reach its desired value for the given flux current command since a lower rotor flux may be adequate for starting the engine. If the start event is delayed beyond this minimum pre-flux time period, the rotor flux will continue building until it reaches the desired level.

Figure 9:
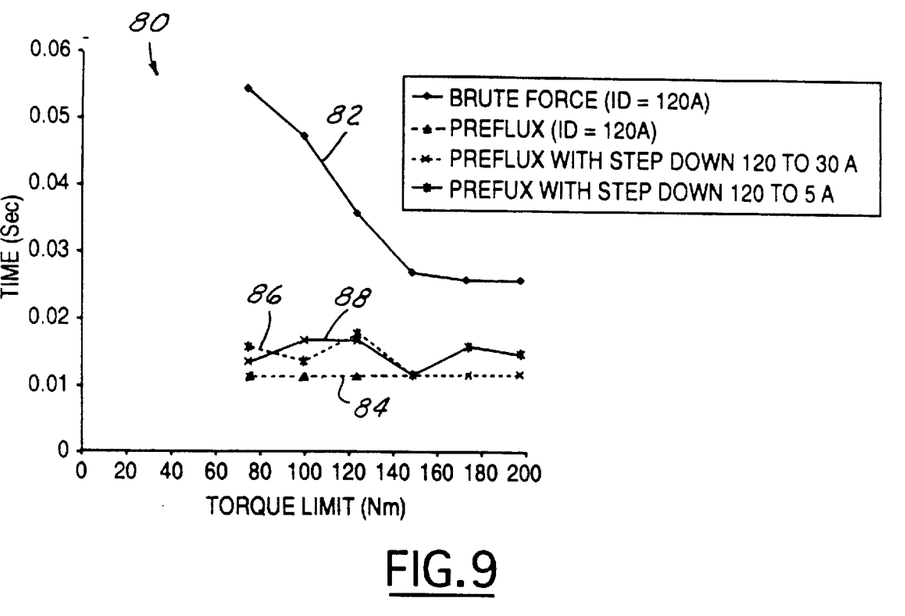
FIG. 9 is a comparison graph depicting the time to first movement as a function of the torque limit for each of the embodiments of the present invention.

The advantages of the present invention in reducing the engine start time are clearly evident when comparing the time to the first movement of the engine for each of the starting strategies. FIG. 9 is a graph 80 of the time to first movement of the engine for each of the starting strategies discussed herein. The graph 80 shows that each of the strategies of the present invention takes between 12 and 18 msec. to register the first velocity measurement from the time of the first torque command. At least 12 msec of this delay is attributable to a computational delay in the controller of up to two loop executions of 6 msec. each before any velocity can be estimated. This means that the first movement occurs essentially at the same time the torque command is applied. It is clearly shown that the reduction in time to first movement for each of the strategies of the present invention, preflux 84, preflux with a step-down 86 and preflux with a step down approaching zero 88, is a significant improvement over the brute force method 82. FIG. 9 shows that for torque limits of 150 to 200 Nm, the time is reduced from the brute force method 82 by about 10 msec. FIG. 9 also shows that as the torque requirement is lowered, the time delay for the brute force method 82 increases exponentially.

Figure 10:
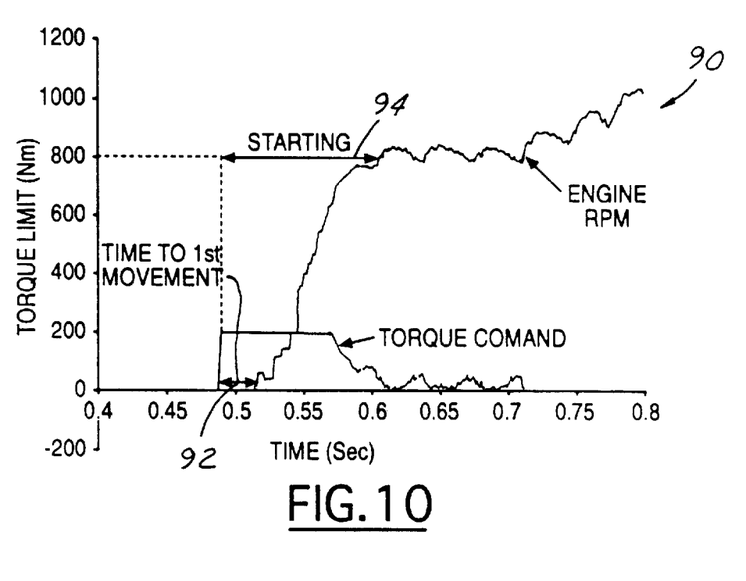
FIG. 10 is a graph of the time periods for time to first movement and starting time for the brute force method known in the art.
Figure 11:
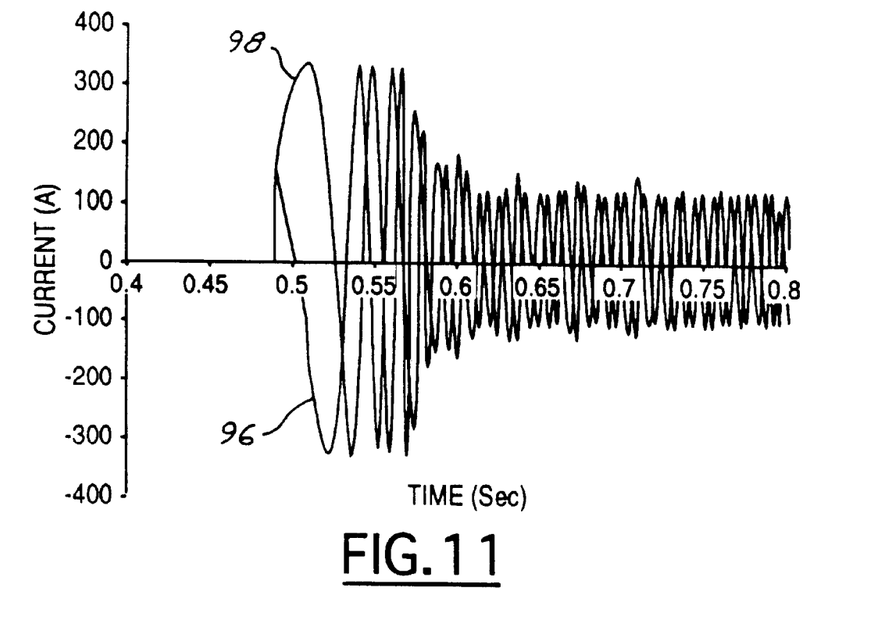
FIG. 11 is a graph of the current waveforms for the brute force method known in the art having a torque limit of 200 Nm.

FIGS. 10–15 provide a comparison between the brute force method and each of the embodiments of the pre-flux starting method of the present invention. FIG. 10 is an example of the brute force starting method 90 having a maximum torque setting of 200 Nm. The time to first movement 92 is 26 msec., and the starting time 94 of 117 msec are shown on the graph 90. FIG. 11 is a graph of the phase current measurements 96 and 98 for the same starting event. The delay in the time to first movement is apparent in the current waveforms 96 and 98 by the initial lower frequency characteristic caused by the action of building up the flux in the rotor.

Figure 12:
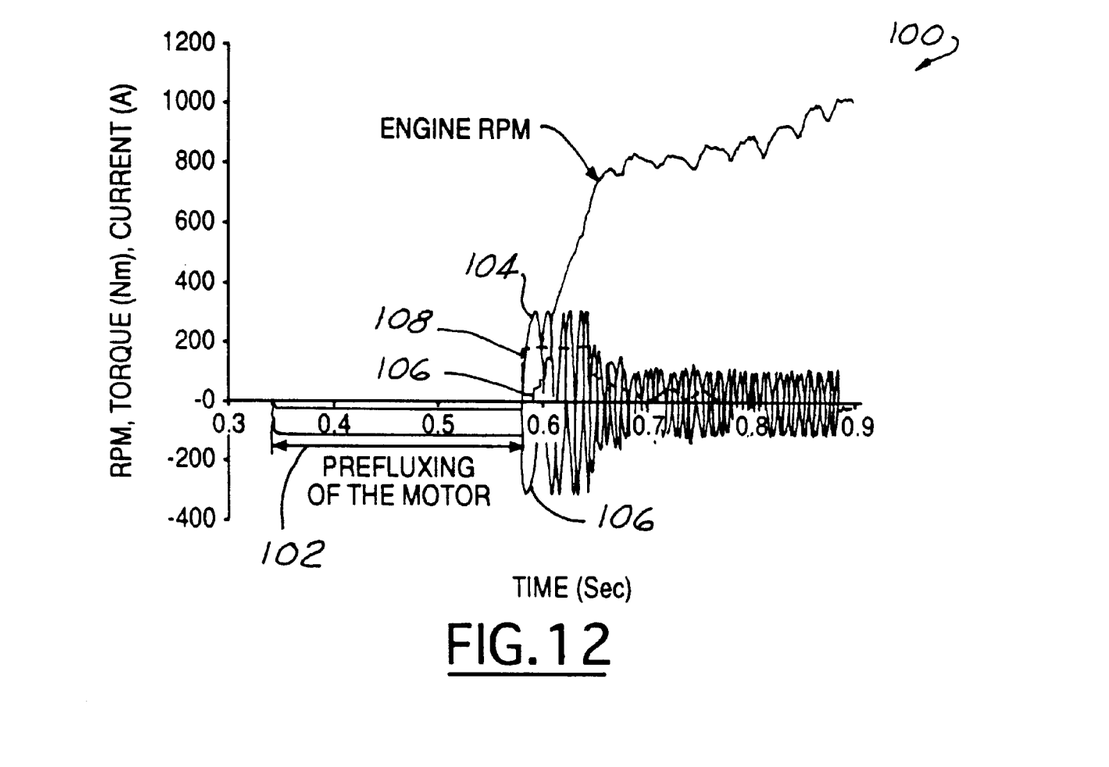
FIG. 12 is a comparison graph of the phase current and the torque command for the pre-flux method of the present invention having a constant $i_{ds}*$. of 120 amps and a torque limit of 200 Nm.

FIG. 12 is a graph 100 of the pre-flux starting method having a constant flux current command. The pre-fluxing of the motor 102 is seen during the time in which the phase current waveforms 104 and 106 are exhibiting a dc characteristic, i.e. between 0 and 0.58 seconds. FIG. 12 shows a movement in the velocity measurement 106 thirteen msec after the initial torque command 108, which is half of that of the brute force example and essentially equal to the computational delay in the velocity calculation due to the controller. The starting time measured was 90 msec, 27 msec faster than the brute force method.

Figure 13:
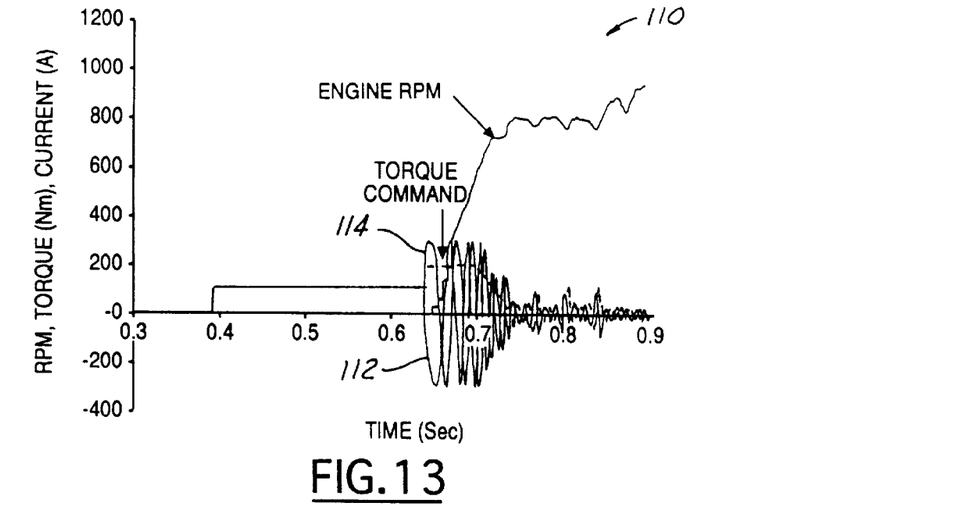
FIG. 13 is a comparison graph of the phase current and the torque command for the pre-flux with step down method of the present invention having a torque limit of 200 Nm and a pre-flux start with a step down in $i_{ds}*$ from 120 amps to 30 amps.

FIG. 13 is a graph 110 of the pre-flux starting method having a step-down from 120 amps to 30 amps. There is a slightly slower starting time of 99 msec, but the peak currents 112 and 114 are reduced from 337 amps to 317 amps.

Figure 14:
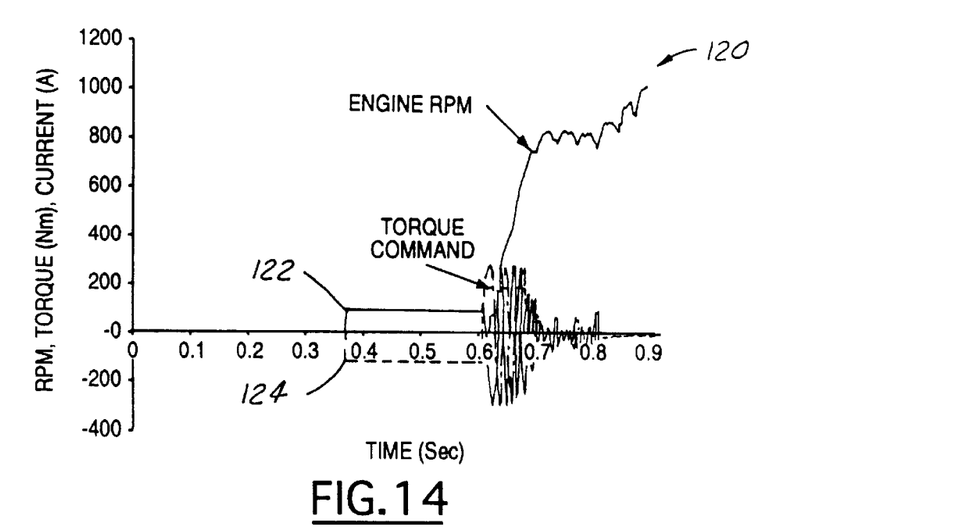
FIG. 14 is a comparison graph of the phase current and the torque command for the pre-flux with step down method of the present invention having a torque limit of 200 Nm and a pre-flux start with a step down in ids from 120 amps to 5 amps.

FIG. 14 is a graph 120 of the pre-flux starting method having a step-down from 120 amps to 5 amps. The measured peak currents 122 and 124 are roughly 311 amps and the starting time remains at 99 msec.

Figure 15:
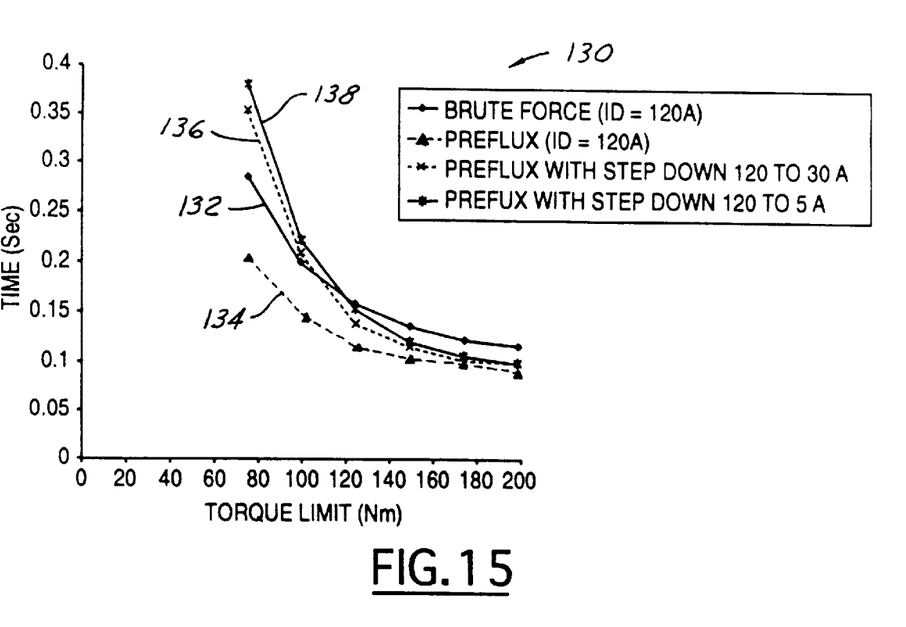
FIG. 15 is a comparison graph of the time it takes to reach 800 RPM as a function of the maximum torque limit for each embodiment of the method of the present invention.

FIG. 15 provides a comparison for the overall response time for each of the starting strategies discussed herein. The graph 130 shows plots of the brute force method 132, the pre-flux with constant flux current command 134, the pre-flux with a step-down flux current command 136 and the pre-flux with a step down approaching zero flux current command 138. It is clear from FIG. 15 that pre-fluxing the motor and maintaining a constant flux current command 134 provides the best overall response time since the induction machine always has high peak torque capability. Although, the pre-flux method with a step-down in the flux current command 136, 138 has the slowest response time at lower torque limits, it still displays an improved performance over the brute force method 132 for torque limits exceeding 120 Nm.

It is clear that the pre-flux method with a constant flux current after the starting event provides the best response times for the same current as the brute force method. However, the pre-flux with step down method achieves nearly the same response time, as the constant current method, with about 15% lower peak current for torque limits exceeding 120 Nm. Therefore, when it is desired to reduce starting times and reduce peak current levels, the pre-flux with step down method is the best application.

Figure 16:
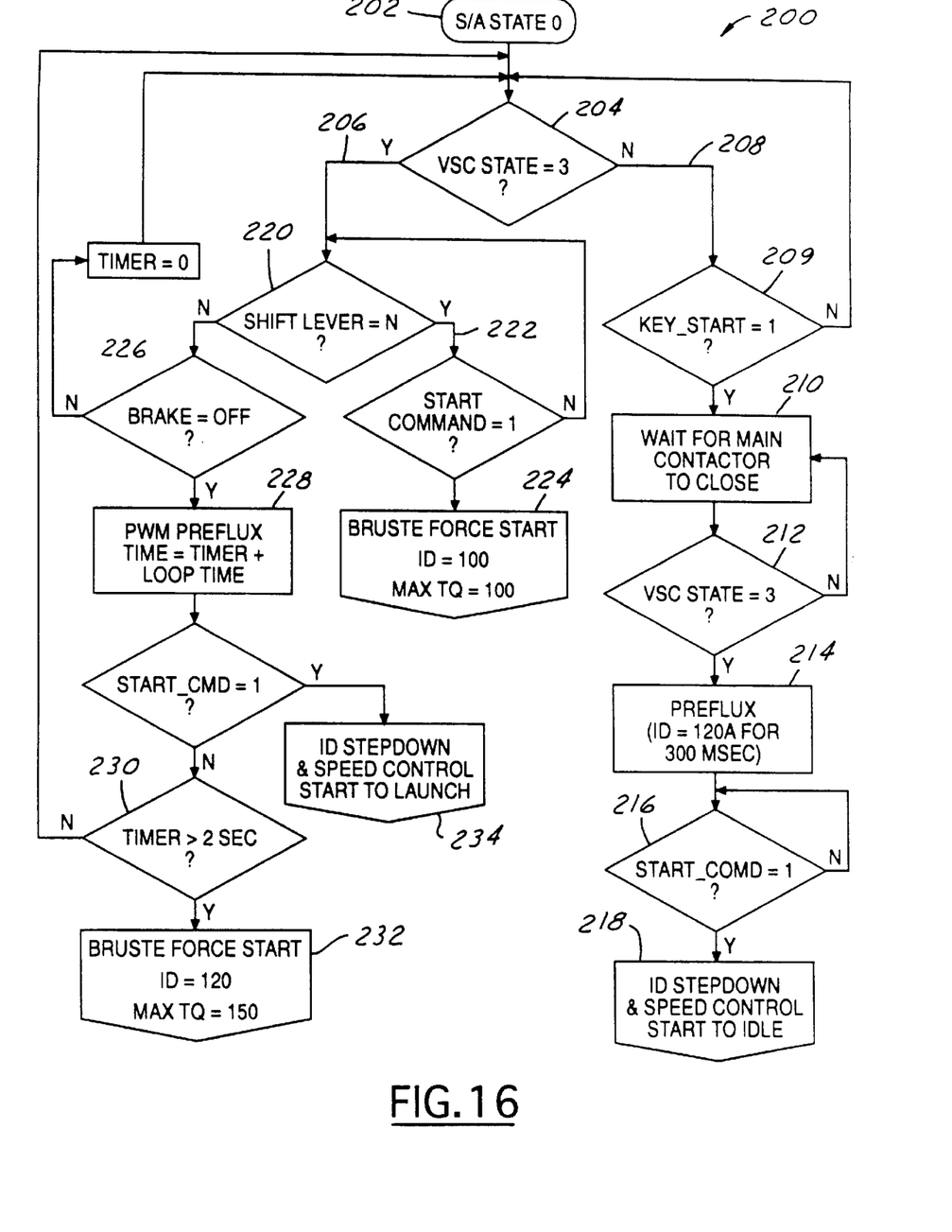
FIG. 16 is a flowchart of the pre-flux method of the present invention.

FIG. 16 is a flowchart diagram of a practical application for the pre-flux starting strategies 200 of the present invention. The strategy presented in FIG. 16 is applicable to a vehicle having a starter/alternator with an engine that implements a start/stop strategy, such as a low storage requirement (LSR) hybrid electric vehicle. The implementation of the pre-flux strategy with a step-down in the flux current command involves two conditional control loop branches. Each branch defines a starting mode of operation. The first mode is a start to idle which occurs at ignition keystart, warm engine restarts when the maximum air conditioning switch is engaged, and warm engine restarts due to a low state of charge in the battery. The second mode is a start to engage which occurs from the accelerator pedal with the intent of launching the vehicle into motion.

The performance goals of the starter/alternator starting strategy will change according to the type of start mode. For starts to idle from the key, the goal is to have a starting time less than or equal to three-hundred amps, with peak currents less than or equal to three-hundred amps. The starting time for starts to idle due to low state of charge, or max AC switch engaged are relaxed, while the peak current levels remain at less than or equal to three-hundred msec. Starts to engage from the accelerator pedal need to achieve engine starting times less than or equal to three-hundred msec to ensure the driver receives a responsive feel to throttle commands. It should be noted that these values are for example purposes only.

Referring now to FIG. 16, the flowchart 200 begins at the point when the starter/alternator is not running, S/A state 0, 202. The starter/alternator must be in the "not running" state to initiate any type of start. The Vehicle System Controller (VSC), when issuing a start command, will also issue a start flag of 0 or 1. A start type of 0 indicates a start to idle, and a start type of 1 indicates a start to engage. Therefore, once in the "not running" mode, the Starter/Alternator Module must decipher whether a start command is pending in order to lead the request with the pre-fluxing of the induction machine.

According to the flowchart 200, the algorithm determines 204 whether or not the VSC is in the driving state (state 3). If this condition is true, then the engine has been running and a start command will result from one of the warm engine restart conditions 206. If the condition 204 is false, this indicates that the next start command will result from a keystart signal 208.

The branch descending from the keystart signal 208 uses the keystart signal from the ignition switch as the indication that the VSC will be sending an engine start command. Once the keystart signal is active 209, the SAM must wait for the pre-charge of the inverter bus to finish and consequently, the main contactor to close 210 before drawing current to pre-flux the induction machine. These conditions are complete when the VSC transitions to the driving state 212. After the VSC transitions to the driving state, there is nominally a 100 to 300 msec delay before the start command is issued. Therefore, assuming the shortest available time delay, the inverter gates are enabled, and a flux current command of 120 amps is applied 214. The flux current command is held constant until the VSC issues the start command 216. At this time, the flux current command is stepped-down 218 to thirty (30) amps and activates the speed control loop to start the engine to the desired idle speed.

If the engine has already been started, the engine starting prediction method becomes much more involved. The branch 206 is used after determining that the engine has been running and will be in a warm engine starting prediction. First the transmission status information is used to determine 220 whether the vehicle is in a "ready-to-drive" condition. If the transmission shift-lever state is in park or neutral, then any start command from the VSC will be a start to idle 222. This condition is not predictive, and therefore, the algorithm resorts to the brute force strategy 224. However, because the performance of this start does not require the response to throttle, it is not as essential, and therefore the torque limit and the flux current command level are reduced to prevent high peak currents.

When the shift lever is detected to be in a position where the vehicle can be launched into motion, the algorithm looks to the state of the brake pedal 226. It is assumed that if the vehicle is in gear, and the driver releases the brake pedal, then the driver intends to press the accelerator to launch the vehicle into motion. Thus, if the brake is off, the SAM begins to pre-flux the machine 228 in an on/off manner, at a frequency related to the rotor time constant.

Figure 17:
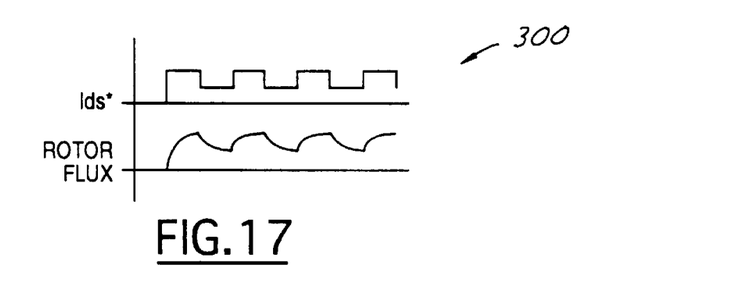
FIG. 17 is a graph of a pwm pre-flux process.

An example of this pulse-width modulated (pwm) pre-flux process 300 is shown in FIG. 17. In addition to toggling the flux current command between two non-zero values as shown in FIG. 17, it is also possible to toggle the flux current command between a non-zero value and zero.

Referring back to FIG. 16, if the time between the release of the brake pedal and the receipt of the start command exceeds 230 a predetermined time limit, i.e. two seconds, the algorithm reverts 232 to the brute force strategy. Otherwise, the flux current command is stepped down and the speed control loop is activated 234 to start the engine to the desired launch speed.

The invention covers all alternatives, modifications, and equivalents, as may be included within the spirit and scope of the appended claims.

What is claimed is:

1. A method for reducing the time to start an internal combustion engine started with an induction machine, said method comprising the steps of:

commanding a flux current alone to the induction machine for a predetermined period of time; and commanding a torque current to the induction machine after said predetermined period of time said flux current alone is commanded to the induction machine;

whereby a desired level of torque for starting the internal combustion engine is produced by the induction machine substantially instantaneously when said torque current is commanded to the induction machine.

2. The method as claimed in claim 1 further comprising the step of reducing said commanded flux current at the same time said torque current is commanded.

3. The method as claimed in claim 2 wherein said step of reducing said commanded flux current further comprises reducing said commanded flux current to a value approaching zero.

4. A method for reducing the time to start an internal combustion engine started with an induction machine and for reducing peak current values, said method comprising the steps of:

commanding a flux current alone to the induction machine for a predetermined period of time; and commanding a torque current to the induction machine after said predetermined period of time said flux current alone is commanded to the induction machine; and reducing said commanded flux current when said torque current is commanded;

whereby a torque producing current is maximized and a desired level of torque for starting the internal combustion engine is produced by the induction machine substantially instantaneously when said torque current is commanded to the induction machine and the peak current values are minimized.

5. The method as claimed in claim 4 wherein said step of commanding a flux current further comprises commanding a flux current that has a value higher than necessary for a period of time less than said predetermined period of time.

6. The method as claimed in claim 5 wherein said step of commanding a flux current that has a value higher than necessary for a period of time less than said predetermined period of time further comprises the step of reducing said flux current to a level necessary for maintaining a desired rotor flux until said torque current is commanded after said predetermined period of time.

7. The method as claimed in claim 4 wherein said step of reducing said commanded flux current further comprises reducing said commanded flux current to a value approaching zero.

8. A method for determining when to pre-flux an induction machine starter/alternator used for starting an internal combustion engine in a vehicle having a transmission system and a brake system, said method comprising the steps of:

determining a "not running" operating state for the starter/alternator;

determining a start status for the internal combustion engine based on said operating state for the starter/alternator; and determining a starting strategy for the induction machine based on said start status for the internal combustion engine.

9. The method as claimed in claim 8 wherein said step of determining a start status further comprises determining a start to idle status for the starter/alternator.

10. The method as claimed in claim 9 wherein said step of determining a start strategy further comprises the steps of:

receiving an indication that a start command will be sent to the starter/alternator;

commanding a flux current to the starter/alternator;

holding said flux current constant until said start command is sent; and reducing said flux current when said start command is sent.

11. The method as claimed in claim 8 wherein said step of determining a start status further comprises determining a start to engage status for the starter/alternator.

12. The method as claimed in claim 11 wherein said step of determining a start to engage further comprises determining a driving condition for the internal combustion engine defined by a state of the transmission system.

13. The method as claimed in claim 12 wherein said transmission system is in a state other than a driving position and further comprising the step of commanding a flux current simultaneously with a torque current.

14. The method as claimed in claim 12 wherein said transmission system is in a driving state and said brake system is in a released state, said method further comprising the steps of:

toggling a flux current command between two current values at a frequency related to a predetermined time constant; and reducing said flux current command when a start to engage signal is received within a predetermined time limit.

15. The method as claimed in claim 12 wherein said transmission system is in a driving state and said brake system is in a released state, said method further comprising the steps of:

toggling a flux current command between two current values at a frequency related to a predetermined time constant; and commanding a constant flux current command in the absence of a start to engage signal being received within a predetermined time limit.

* * * * *